United States Patent
Yeo

(10) Patent No.: US 6,665,602 B2
(45) Date of Patent: Dec. 16, 2003

(54) KICK-DOWN SHIFT CONTROL METHOD FOR FIVE-SPEED AUTOMATIC TRANSMISSION

(75) Inventor: Chang-Gi Yeo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/040,612

(22) Filed: Oct. 24, 2001

(65) Prior Publication Data

US 2002/0095250 A1 Jul. 18, 2002

(30) Foreign Application Priority Data

Oct. 30, 2000 (KR) .......................................... 2000-63893

(51) Int. Cl.[7] ............................................... F16H 61/08
(52) U.S. Cl. ........................................... 701/55; 701/66
(58) Field of Search ............................... 701/55, 51, 66; 477/46, 124, 107, 115, 125; 74/335, 339

(56) References Cited

U.S. PATENT DOCUMENTS

| | | | | | |
|---|---|---|---|---|---|
| 5,697,864 A | * | 12/1997 | Watanabe | .................. | 477/98 |
| 5,809,835 A | * | 9/1998 | Beim et al. | .................. | 74/335 |
| 5,863,276 A | * | 1/1999 | Lee | .................. | 477/144 |
| 6,085,140 A | * | 7/2000 | Choi | .................. | 701/55 |
| 6,134,495 A | * | 10/2000 | Hollingsworth | .................. | 701/51 |
| 6,336,372 B1 | * | 1/2002 | Ogami et al. | .................. | 74/335 |
| 2002/0014130 A1 | * | 2/2002 | Ogami et al. | .................. | 74/335 |

FOREIGN PATENT DOCUMENTS

| | | | | | |
|---|---|---|---|---|---|
| JP | 02154859 A | * | 6/1990 | ............ | F16H/61/10 |
| JP | 09257462 A | * | 10/1997 | ............ | G01B/21/22 |

* cited by examiner

Primary Examiner—Michael J. Zanelli
(74) Attorney, Agent, or Firm—Christie, Parker & Hale, LLP

(57) ABSTRACT

A kick-down shift control method for a five-speed automatic transmission comprises: detecting a fifth-to-third or fifth-to-second gear shifting signal; performing fifth-to-fourth gear shifting by performing a duty control on a secondary shift part if the fifth-to-third or fifth-to-second gear shifting signal is detected; determining a starting point of duty control on a release side of a primary shift part, and performing duty control on the release side of the primary shift part; and performing duty control on a coupling part of the primary shift part.

3 Claims, 3 Drawing Sheets

KICK-DOWN SHIFT CONTROL METHOD FOR FIVE-SPEED AUTOMATIC TRANSMISSION

CROSS-REFERENCE TO RELATED APPLICATION

This application claims priority of Korea patent Application No. 10-2000-0063893, filed on Oct. 30, 2000.

BACKGROUND OF THE INVENTION (a) Field of the Invention

The present invention relates to a gear shift control method for automotive vehicles. More specifically, the present invention relates to a kick-down control method for improving shift response in controlling fifth-to-third or fifth-to-second gear skip-shifting.

(b) Description of the Related Art

In general, an automotive vehicle equipped with an automatic transmission controls hydraulic pressure in a preset fashion based on the running speed of the vehicle, to automatically change gears to a target gear.

The automotive vehicle actuates a torque converter according to the output power of an engine to transfer the power to the transmission, and to make the hydraulic pressure operative to a particular valve based on a control signal applied from a transmission control unit so that a corresponding gear change operation occurs according to the operational status of the vehicle.

In such an automotive vehicle with an automatic transmission of which the operational status is controlled based on hydraulic pressure, the driver does not have to manipulate a clutch pedal to interrupt power from the engine while changing gears, so that he/she has less driving fatigue and rarely encounters an engine stall caused by malfunction or inexperience. It is thus easy for a beginner to drive such an automotive vehicle with an automatic transmission.

The output power of a planetary gear set is changed based on the selective operation of friction members that comprise, for example, clutches and brakes, to output adequate shift ratios, and the power is transmitted to a drive gear. The changed power is then transmitted to a slave gear, which is meshed with a final speed-up gear, by means of a driven gear meshed with the drive gear to control the rotation of wheels.

Regulating the status of the hydraulic pressure generated by way of the torque converter to control shifting to a target gear, especially fifth-to-third or fifth-to-second gear kick-down shifting, can be performed in conventional hydraulic control systems as illustrated in FIG. 1. It includes: a fifth-to-fourth gear shifting stage during which a release control on a release side of a secondary shift part that operates in fifth speed is performed according to a duty pattern "a" of FIG. 1, and a coupling control on a coupling side of the second shift part that operates in fourth speed is then performed according to a duty pattern "c" of FIG. 1 and a fourth-to-third or fourth-to-second gear shifting stage during which a release control on a release side of a primary shift part is performed according to a duty pattern "b" of FIG. 1, and a coupling control on a coupling side of the primary shift part is then performed according to a duty pattern "d" of FIG. 1.

Due to a hold time that corresponds to a time interval "E" for control on the coupling side as performed by the secondary shift part control and a time interval of adverse slope control on the release side by the primary shift control, shift response is slow and maintenance of the engine rpm occurs during the hold time so that the driver is easily irritated by the slow gear shifting with respect to a feeling of acceleration.

SUMMARY OF THE INVENTION

It is an object of the present invention to solve the problems with the prior art and to reduce a hold time during fifth-to-third or fifth-to-second gear kick-down shifting to improve shift feel.

In one aspect of the present invention, there is provided a method for improving kick-down shift response of a five-speed automatic transmission by reducing a hold time during fifth-to-third or fifth-to-second gear shifting by using: a turbine rpm sensor of which the operational status is varied based on the rotational status of a turbine connected to an input shaft of the automatic transmission, to determine the rpm of the turbine; a transmission output shaft rpm sensor that detects a transmission output shaft rpm; a transmission control unit that controls a gear shift of the transmission by outputting shift signals; and a hydraulic pressure control system that performs the gear shifting by-being inputted the gear shift signal.

The method for improving kick-down shift response of a five-speed automatic transmission in accordance with the present invention includes:

(a) detecting a fifth-to-third or fifth-to-second gear shifting signal;

(b) performing fifth-to-fourth gear shifting by performing a duty control on a secondary shift part if the fifth-to-third or fifth-to-second gear shifting signal is detected in step (a);

(c) determining a starting point of duty control on a release side of a primary shift part, and performing duty control on the release side of the primary shift part; and (d) performing duty control on a coupling part of the primary shift part.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Hereinafter, a description will be given of a kick-down shift control method for a five-speed automatic transmission according to the preferred embodiment of the present invention.

First, a gear change system for implementation of the present invention will be described with reference to FIG. 2, which is a block diagram of a kick-down shift control system of a five-speed automatic transmission in accordance with an embodiment of the present invention.

Figure 1:
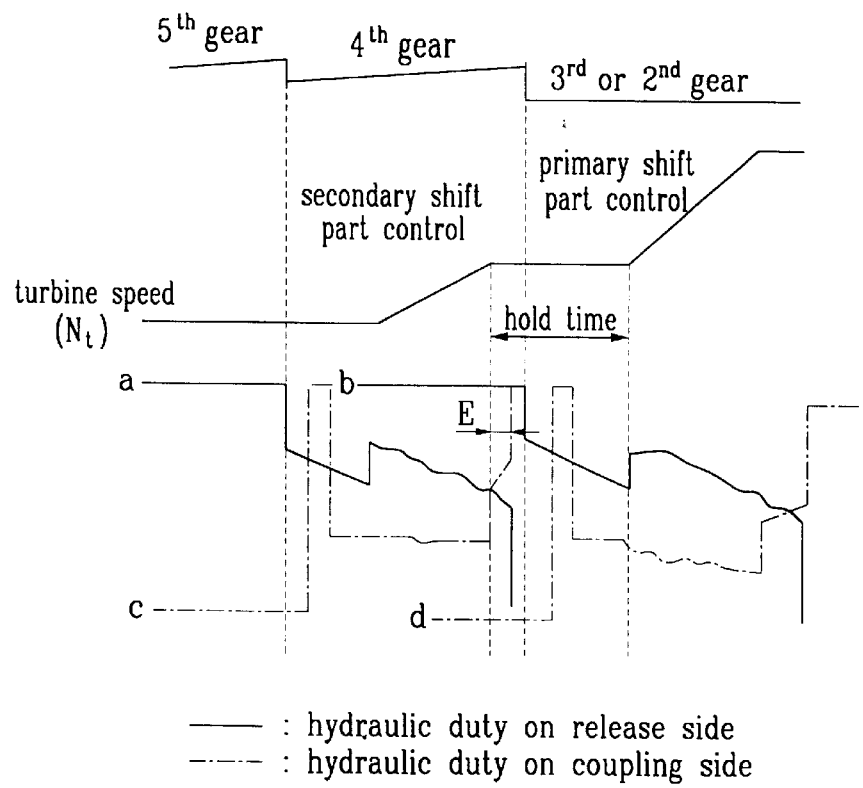
FIG. 1 depicts the pattern of hydraulic pressure control during fifth-to-third or fifth-to-second gear shifting performed by a conventional five-speed automatic transmission.
Figure 2:
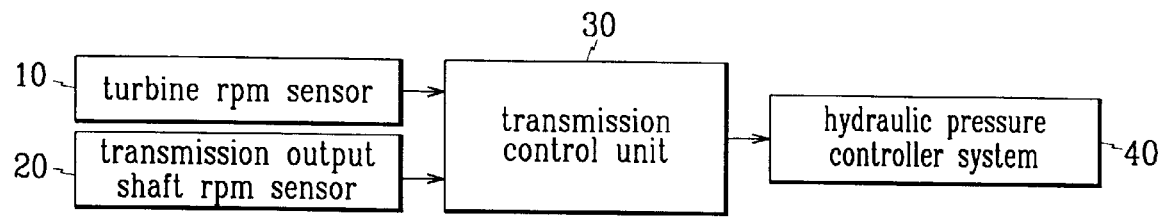
FIG. 2 is a block diagram of a kick-down shift controller of a five-speed automatic transmission in accordance with an embodiment of the present invention.

The kick-own shift control system of a five-speed automatic transmission, as shown in FIG. 2, comprises: a turbine rpm sensor 10 of which the operational status is varied based on the rotational status of a turbine connected to an input shaft of the automatic transmission, to determine the rpm of the turbine; a transmission output shaft rpm sensor 20 that detects a transmission output shaft rpm, a transmission control unit 30 that controls a gear shift of the transmission by outputting shift signals; and a hydraulic pressure control system 40 that performs the gear shifting by having the gear shift signal input thereto.

Now, the operation of the transmission control unit 30 for improving kick-down shift response of a five-speed automatic transmission will be described in detail with reference to FIGS. 3 and 4.

Figure 3:
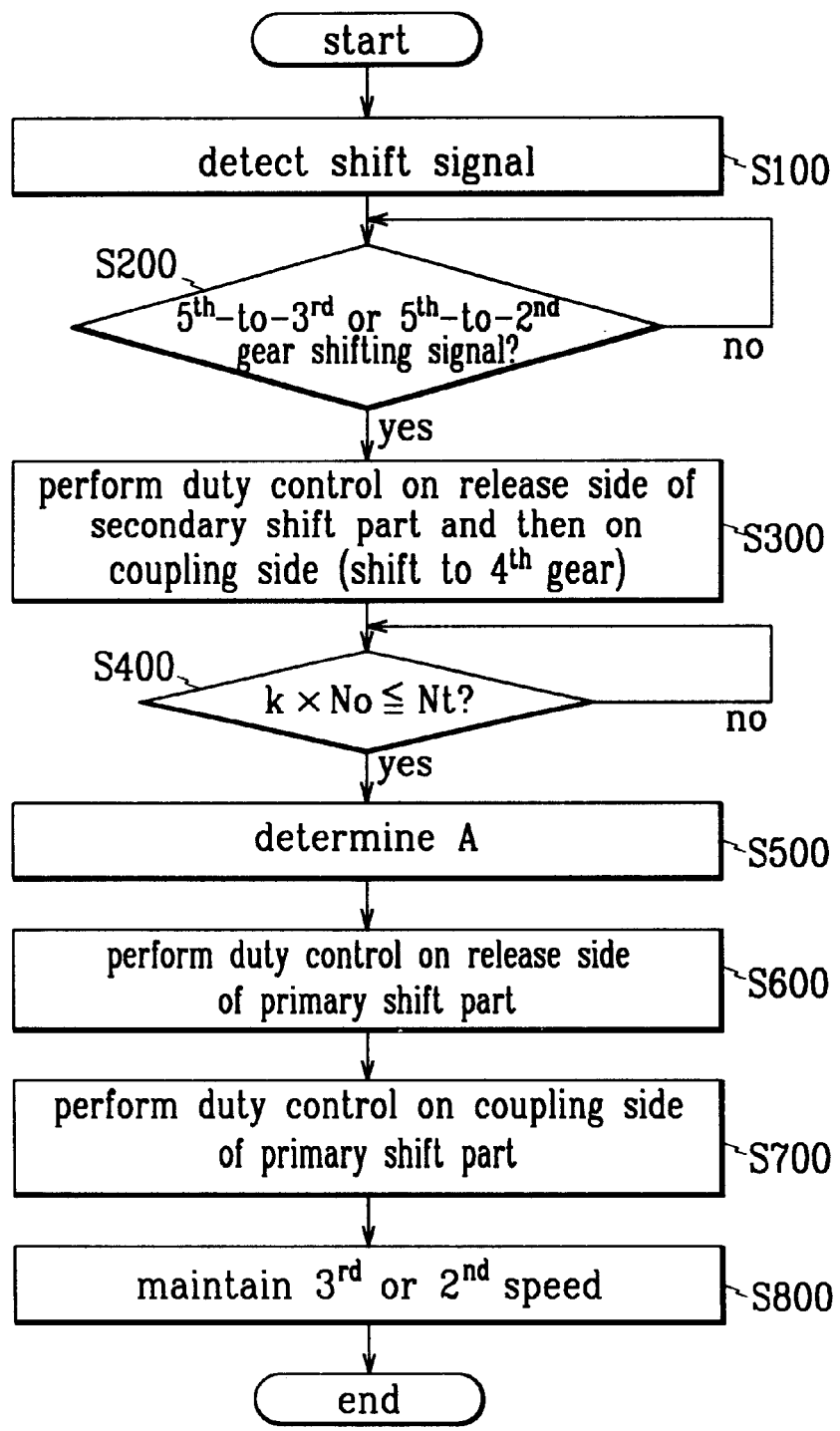
FIG. 3 is a flow chart showing a method for improving kick-down shift response of a five-speed automatic transmission in accordance with an embodiment of the present invention.
Figure 4:
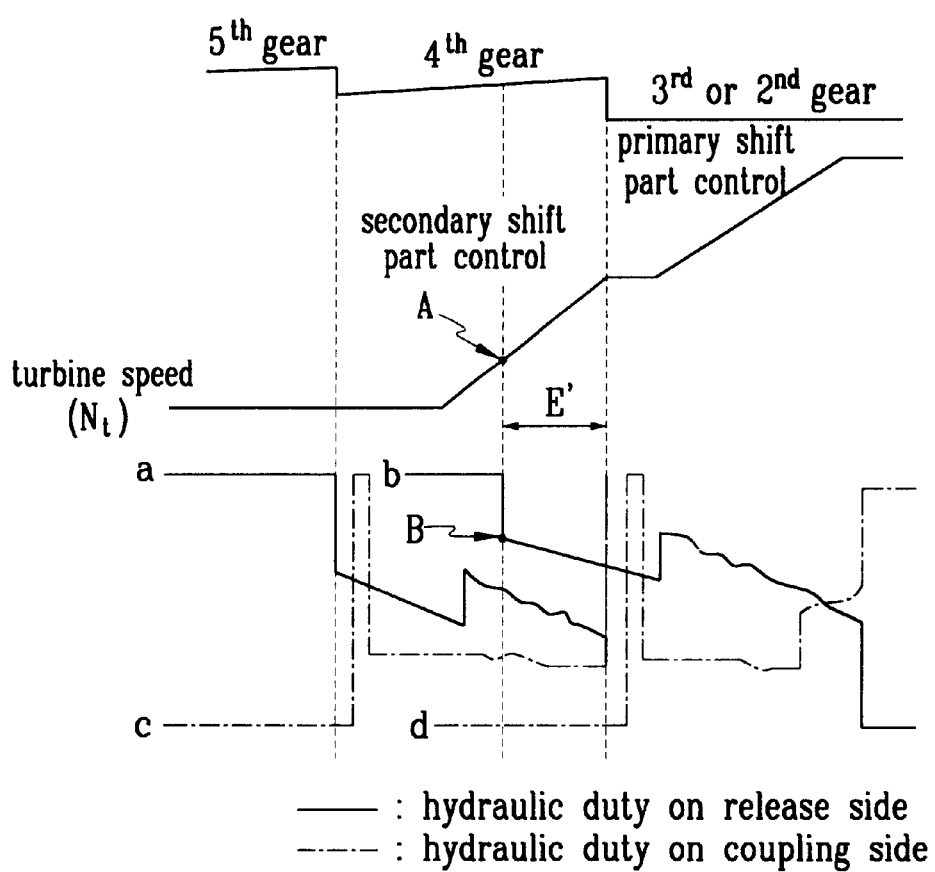
FIG. 4 depicts the pattern of hydraulic pressure control during fifth-to-third or fifth-to-second gear shifting performed by a five-speed automatic transmission in accordance with an embodiment of the present invention.

FIG. 3 is a flow chart showing a method for improving kick-down shift response of a five-speed automatic transmission in accordance with the preferred embodiment of the present invention, and FIG. 4 depicts the pattern of hydraulic pressure control during fifth-to-third or fifth-to-second gear shifting performed by a five-speed automatic transmission in accordance with the preferred embodiment of the present invention.

If the driver depresses an accelerator pedal to rapidly accelerate a vehicle while the vehicle is traveling in the fifth speed, the transmission control unit 30 determines a target speed with reference to driving states, and outputs a corresponding shift signal. The present invention relates to a case when the target speed is a second speed or a third speed.

First, the transmission control unit 30 detects a shift signal and determines whether a fifth-to-second skip-shift signal or a fifth-to-third skip-shift signal is generated (S100 and S200).

If it is determined that the fifth-to-second skip-shift signal or the fifth-to-third skip-shift signal is generated in step S200, duty control on a release side of a secondary shift part is performed according to a duty pattern of "a" of FIG. 4, and duty control on a coupling side of the secondary shift; part is then performed according to a duty pattern of "b" of FIG. 4 (S300). Consequently, in the present invention, gear shifting to fourth speed is carried out by controlling the secondary shift part.

While gear shifting to fourth speed is being performed, the transmission control unit 30 determines a starting point "A" of duty control on a release side of a primary shift part, and performs duty control on the release side of the primary shift part.

To determine the starting point "A" of duty control on a release side of a primary shift part, the transmission control unit 30 uses a turbine rpm $N_t$ and the transmission output shaft rpm $N_o$. The starting point "A" is a point of time at which $N_t$ becomes larger than or equal to a calculation of K (a predetermined coefficient determining the starting point of control on the release side of the main transmission)×$N_o$ (S400 and S500).

If the starting point "A" is determined, duty control on the release side of the primary shift part is performed according to a duty pattern "b" of FIG. 4 (S600), and then duty control on a coupling side of the primary shift part is performed according to a duty pattern "d" of FIG. 4 (S700).

After shifting of gears to a second speed or a third speed is carried out, the second speed or the third speed is maintained (S800).

Also, when the duty control on the release side of the primary shift part is performed at point "A", a duty ratio $\{(Dmr)j\}$ of a point "B" is obtained by a calculation of $[(Dmr_o)j+(Dmr_L)j] \times K_E + \Delta D_T$, wherein the $(Dmr_o)j$ is an output duty basic value that is determined by a map of N, of a second and third speed, the $(Dmr_L)j$ is a output value learning value, the $K_E$ is a compensation coefficient for an engine speed, the $\Delta D_T$ is a compensation coefficient for fluid temperature, and j indicates a second or third speed. Then, the duty ratio is controlled to decrease according to a reverse inclination duty ratio $\{dDmr\}j\}$.

As a result, hold time can be decreased by performing the duty control on the primary shift part before the duty control on the secondary shift part is completed. Therefore, the kick-down shift response can be enhanced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A kick-down shift control method for a five-speed automatic transmission comprising:

(a) detecting a fifth-to-third or fifth-to-second gear shifting signal;

(b) performing fifth-to-fourth gear shifting by performing a duty control on a secondary shift part if the fifth-to-third or fifth-to-second gear shifting signal is detected in step (a);

(c) determining based on a turbine rpm, $N_t$, and a transmission output shaft rpm, $N_o$, a starting point of duty control on a release side of a primary shift part, and performing duty control on the release side of the primary shift part; and (d) performing duty control on a coupling side of the primary shift part.

2. The method of claim 1 wherein the starting point is a point of time in which $N_t$ becomes greater than or equal to K multiplied by $N_o$, wherein K is a predetermined coefficient determining the starting point of control on the release side of the main transmission.

3. The method of claim 1 wherein in step (c), the duty ratio of the release side of the primary shaft part is determined by a calculation of $[(Dmr_o)j+(Dmr_L)j] \times K_E + \Delta D_T$, wherein $(Dmr_o)j$ is an output duty basic value, $(Dmr_L)j$ is an output learning value, $K_E$ is a compensation coefficient for an engine speed, $\Delta D_T$ is a compensation coefficient for fluid temperature, and j indicates a second or third speed.

* * * * *